United States Patent [19]

Vance

[11] Patent Number: 5,452,819
[45] Date of Patent: Sep. 26, 1995

[54] AIR VALVE FUEL FILL CAP

[76] Inventor: Michael L. Vance, 1652 Poplar Springs Rd., Talbott, Tenn. 37877

[21] Appl. No.: 55,273

[22] Filed: May 3, 1993

[51] Int. Cl.⁶ .................................................. B65D 51/16
[52] U.S. Cl. ................ 220/303; 220/254; 220/DIG. 16; 220/203.01; 215/230; 215/315; 116/70; 116/272; 137/588
[58] Field of Search .................................. 220/212, 254, 220/303, 202, 203, 86.1, DIG. 16; 215/228, 230, 315; 116/34 R, 70, 272; 73/709, 741, 744; 137/230, 232, 224, 588; 141/29, 95, 98

[56] References Cited

U.S. PATENT DOCUMENTS

| | | | |
|---|---|---|---|
| 1,420,110 | 6/1922 | Kligge | 116/272 |
| 1,472,366 | 10/1923 | Kelsey | 137/230 X |
| 1,564,644 | 12/1925 | Taylor | 73/709 |
| 1,726,243 | 8/1929 | Scott et al. | 116/34 R |
| 2,546,475 | 3/1951 | Rizzo et al. | 220/86.1 |
| 2,635,630 | 4/1953 | Cornelius | 116/272 X |
| 2,987,071 | 6/1961 | Haus | 137/230 |
| 3,205,923 | 9/1965 | Wilson | 137/588 X |
| 3,393,717 | 7/1968 | Holmes | 220/202 X |
| 3,450,147 | 6/1969 | Webb | 137/230 X |
| 3,451,589 | 6/1969 | Lee | 220/203 X |
| 4,051,971 | 10/1977 | Saleri et al. | 215/260 |
| 4,059,113 | 11/1977 | Beinsen et al. | 215/309 X |
| 4,222,276 | 9/1980 | DeRogatis | 73/714 |
| 5,329,975 | 7/1994 | Heitel | 215/228 X |

Primary Examiner—Allan N. Shoap
Assistant Examiner—Vanessa Caretto

[57] ABSTRACT

A fuel fill cap for use in cooperation with a fuel tank of a fuel utensil to direct pressurized air within the fuel tank, wherein the cap includes a valve member mounted within the cap to permit pressurizing of the fuel tank through the cap. A modification of the invention includes a pressure gauge structure in association with the cap, as well as the pressure gauge and a pressure gauge audible whistle to indicate excess pressurization of the fuel tank.

1 Claim, 4 Drawing Sheets

AIR VALVE FUEL FILL CAP

BACKGROUND OF THE INVENTION

1. Field of the Invention

The field of invention relates to fuel tank structure and more particularly to an Air Valve Fuel Fill Cap to enhance pneumatic pressurizing of a fuel tank.

2. Description of the Prior Art

The use of fuel tanks in cooperation with various utensils typically utilized in camping and the like is available in the prior art. Fuel tanks utilizing liquid fuel in camp stoves and camp lanterns typically employ a manual pump to pressurize fuel within the fuel tank to direct such fuel to the associated burner assembly structure of a fuel utensil such as indicated in U.S. Pat. No. 3,510,024.

The instant invention attempts to overcome deficiencies of the prior art by providing for a valve assembly arranged to permit cooperation with a pneumatic pressurized source to effect pressurizing of the fuel tank in lieu of the associated manual pneumatic pump and in this respect, the present invention substantially fulfills this need.

SUMMARY OF THE INVENTION

In view of the foregoing disadvantages inherent in the known types of camp utensil fuel tank structure now present in the prior art, the present invention provides an air valve fuel fill cap wherein the same is arranged to direct ease of pressurizing of a fuel tank relative to a fuel utensil. As such, the general purpose of the present invention, which will be described subsequently in greater detail, is to provide a new and improved air valve fuel fill cap which has all the advantages of the prior art camping apparatus and none of the disadvantages.

To attain this, the present invention provides a fuel fill cap for use in cooperation with a fuel tank of a fuel utensil to direct pressurized air within the fuel tank, wherein the cap includes a valve member mounted within the cap to permit pressurizing of the fuel tank through the cap. A modification of the invention includes a pressure gauge structure in association with the cap, as well as the pressure gauge and a pressure gauge audible whistle to indicate excess pressurization of the fuel tank.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved air valve fuel fill cap which has all the advantages of the prior art camping apparatus and none of the disadvantages.

It is another object of the present invention to provide a new and improved air valve fuel fill cap which may be easily and efficiently manufactured and marketed.

It is a further object of the present invention to provide a new and improved air valve fuel fill cap which is of a durable and reliable construction.

An even further object of the present invention is to provide a new and improved air valve fuel fill cap which is susceptible of a low cost of manufacture with regard to both materials and labor, and which accordingly is then susceptible of low prices of sale to the consuming public, thereby making such air valve fuel fill caps economically available to the buying public.

Still yet another object of the present invention is to provide a new and improved air valve fuel fill cap which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
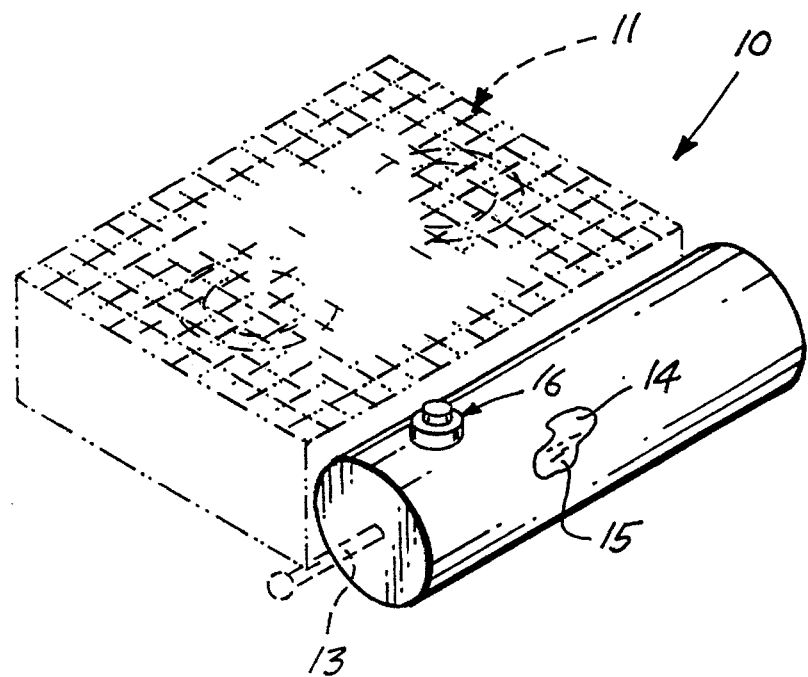
FIG. 1 is an isometric illustration of the invention in use.
Figure 2:
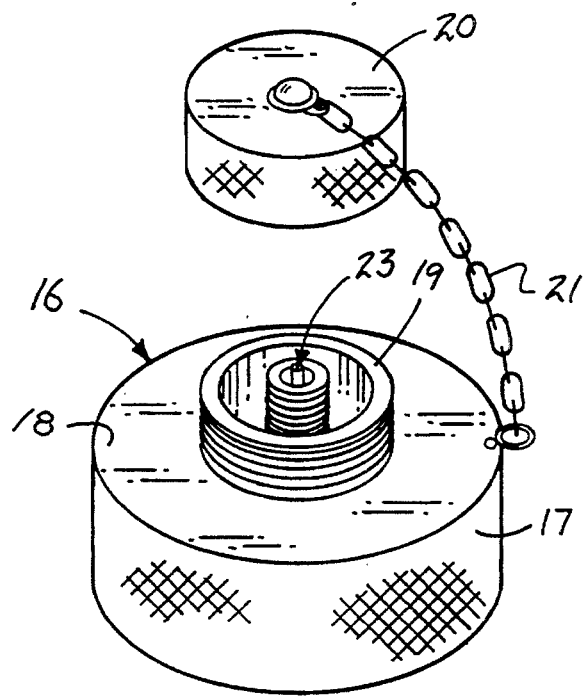
FIG. 2 is an isometric illustration of the fuel fill cap of the invention.
Figure 3:
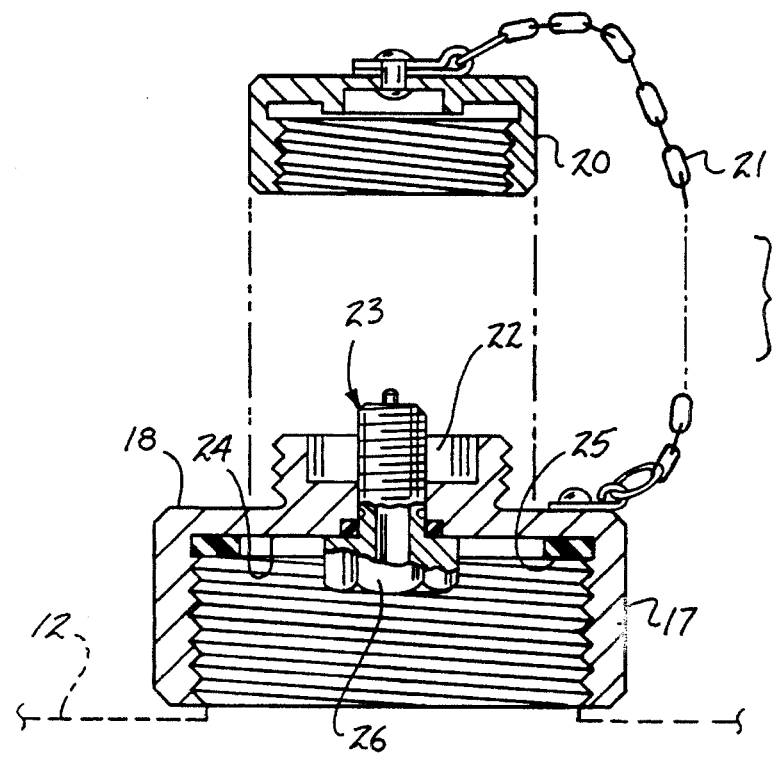
FIG. 3 is an orthographic cross-sectional illustration of the fuel fill cap.

With reference now to the drawings, and in particular to FIGS. 1 to 8 thereof, a new and improved air valve fuel fill cap embodying the principles and concepts of the present invention and generally designated by the reference numeral 10 will be described.

More specifically, the air valve fuel fill cap 10 of the invention essentially comprises cooperation with a fuel utensil 11, such as a stove or lantern structure, as indicated in U.S. Pat. No. 3,510,024 incorporated herein by reference. The utensil 11 includes a fuel tank 12 that is provided with a manual pneumatic pump 13 to effect pressurizing within the tank cavity 14 to direct liquid fuel 15 from the fuel tank 12 to the utensil 11. A cap member 16 is mounted to the fuel tank 12 to permit replenishment of fuel 15 within the cavity 14. To this end, the cap member 16 includes a cap member side wall 17 and a cap member top wall 18, with a top wall boss 19 integrally mounted to the top wall 18 to receive a boss cap 20. The boss cap 20 includes a tether member 21 to secure the boss cap 20 to the cap member 16.

Figure 4:
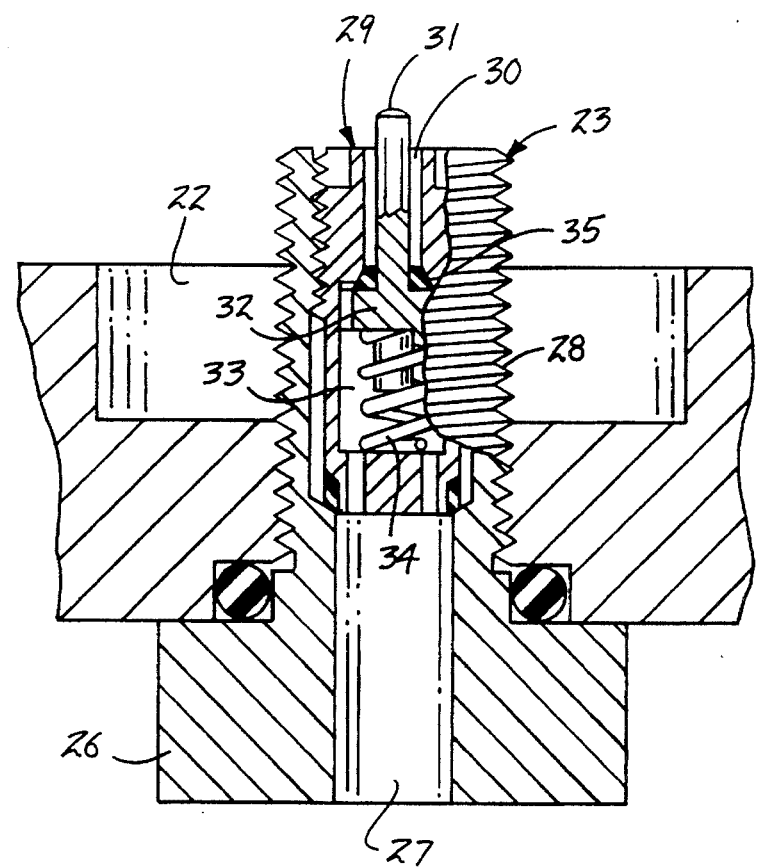
FIG. 4 is an enlarged cross-sectional illustration of the valve structure of the fuel fill cap.

The top wall boss 19 includes a boss well 22, with a valve member 23 (see FIGS. 2–4 for example) mounted and extending into the boss well and extending from the cap member inner top wall surface 24 through the top wall 18. An annular seal 25 is mounted within the cap member side wall 17 in communication with the inner top wall surface 24 for effecting sealing when secured to an associated fuel tank 12. The valve member 23 includes a valve head 26 secured to the inner top wall surface 24 and extending through the cap member top wall 18 received within the well 22. A valve head port 27 originates from the valve head and extends therethrough, with a valve insert 29 mounted within the valve head port 27. It should be noted that the valve head port 27 is directed through a valve head shaft 28 extending from the valve head 26 into the well 22, as illustrated in FIG. 4 for example. The valve insert 29 includes a valve insert port 30 directed therethrough in pneumatic communication with the valve head port 27, such that a valve rod 31 is reciprocatably mounted within the valve insert port 30, with the valve rod having a valve rod head 32 received within the valve insert cavity 33 of the valve insert 29. A rod spring 34 is interposed between the valve rod head 32 within a floor portion of the valve insert cavity 33 to bias the valve rod head 32 into contiguous communication with an insert annular seat 35 in a normal configuration, whereupon pressurized air directed into the valve member 23, and more specifically into the valve insert port 30, displaces the valve rod head 32 from the annular seat 35 to direct air through the valve head port 27 into the associated tank cavity 14.

Figure 5:
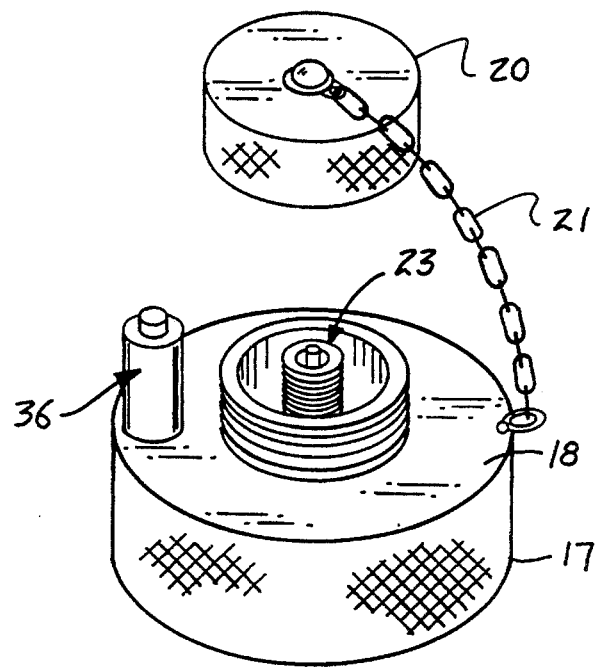
FIG. 5 is an isometric illustration of the fuel fill cap employing a pressure gauge.
Figure 6:
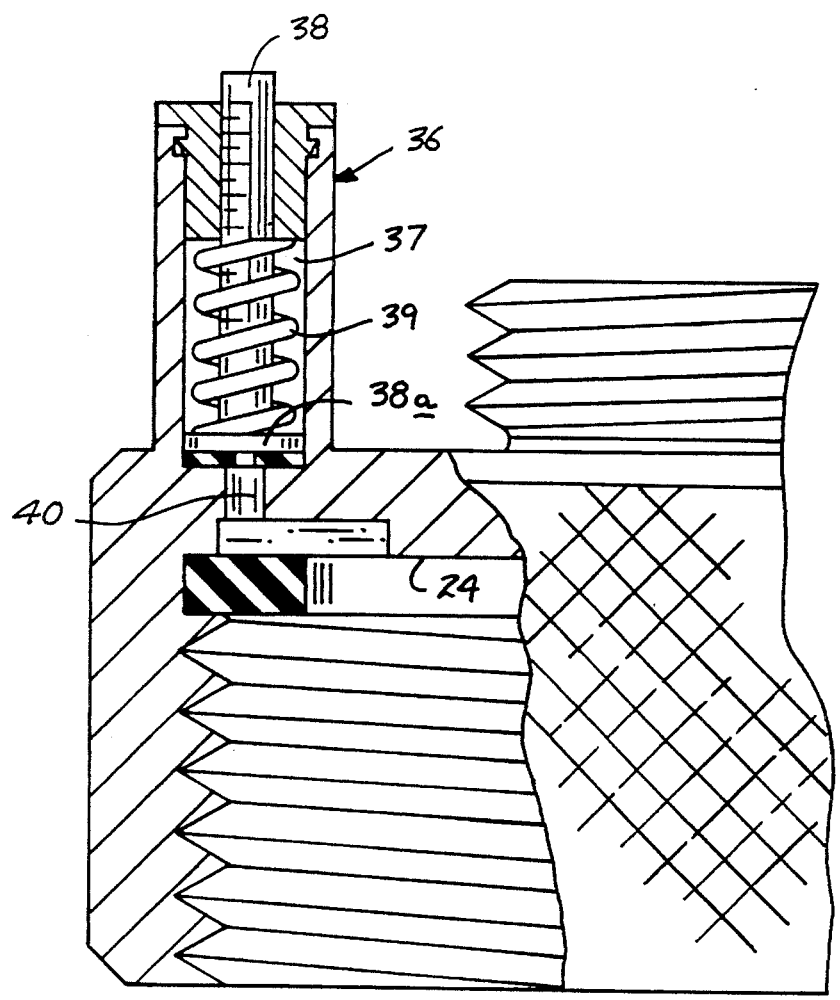
FIG. 6 is an enlarged orthographic cross-sectional illustration of the pressure gauge structure, as illustrated in FIG. 5.

The FIGS. 5 and 6 indicate the use of a pressure gauge 36 mounted through the cap top wall 18, with the pressure gauge 36 including a gauge cavity 37 mounting a gauge rod 38 that includes a gauge rod head 38a positioned over a gauge port 40 in communication with the tank cavity 14 as the gauge port 40 is directed through the inner top wall surface 24.

Figure 7:
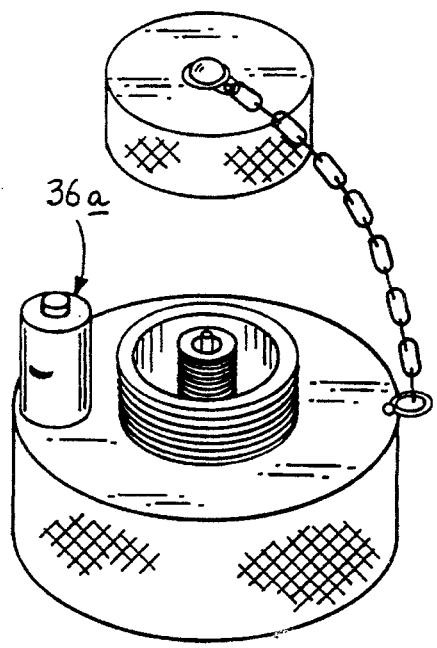
FIG. 7 is an isometric illustration of a modified pressure gauge structure as employed by the invention.
Figure 8:
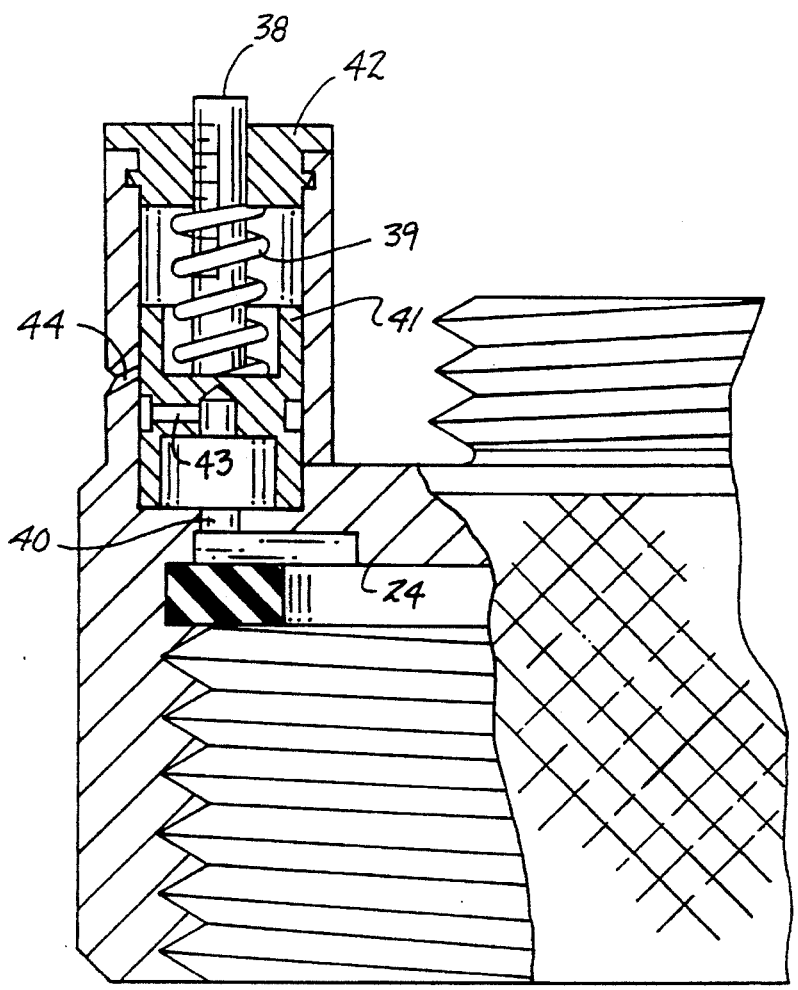
FIG. 8 is an orthographic cross-sectional illustration of the modified pressure gauge structure, as indicated in FIG. 7.

Reference to the FIGS. 7 and 8 indicates a modified pressure gauge 36a, wherein the gauge port 40 in lieu of the gauge rod head 38a is mounted to a reciprocating gauge slide head 41 slidably mounted between the gauge top wall 42 slidably receiving the gauge rod 38 therethrough. The gauge rod spring 39, as indicated, is captured between the gauge top wall 42 and the slide head 41, whereupon the slide head 41 includes a slide head port 43 that is in a first position displaced relative to a gauge body port 44 directed through the gauge body, whereupon displacement of the slide head 41 upon excess pressure within the tank cavity 14, the slide head port 43 effects a pneumatic communication with the gauge body port 44 to effect a whistling sound due to the venturi effect and configuration of the gauge body port 44. In this manner, excess pressurization within the tank cavity 14 is indicated audibly as well as visually relative to the modified pressure gauge 36a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air valve fuel fill cap for securement to a fuel tank, wherein the fill cap comprises, a cap side wall and a cap top wall, with the cap top wall including a top wall exterior surface and a top wall interior surface, and a valve member directed through the top wall extending through the top wall exterior surface and directed through the top wall interior surface, and metering means mounted within the valve member for directing pneumatic pressurized air therethrough, and the top wall includes a top wall boss mounted to the top wall exterior surface, wherein the top wall boss includes a boss well directed into the top wall boss, and the valve member including a valve head mounted to the top wall interior surface and a valve head shaft extending through the top wall projecting through the top wall exterior surface within the well, and the metering means including a valve head port directed coextensively through the valve head and the valve head shaft, with a valve insert mounted within the valve head port, the valve insert in pneumatic communication with the valve head port, and the valve insert including a valve rod reciprocatably mounted within the valve insert, the valve rod including a valve rod head and an insert cavity positioned within the valve insert receiving the valve rod head, with a rod spring, and an annular seat, with the valve rod head arranged in contiguous communication with the annular seat, with the rod spring imposed upon the valve rod head to bias the valve rod head in communication with the annular seat, whereupon pneumatic pressure directed into the valve member and the valve insert displaces the valve rod head relative to the annular seat directing pneumatic pressure through the valve head port, and a pressure gauge, the pressure gauge mounted onto the top wall, the pressure gauge including a pressure gauge housing fixedly mounted to the top wall, and the housing having a gauge cavity, and a gauge rod mounted within the gauge cavity, the gauge rod arranged for reciprocation within the gauge cavity, and the housing further including a gauge top wall receiving the gauge rod reciprocatingly therethrough, with the gauge rod including biasing means for biasing the gauge rod head towards the top wall exterior surface within the housing, and the gauge rod head is slidably mounted within the gauge cavity, with the gauge rod head including a head port, and the housing including a housing port, wherein the head port is displaced from the housing port in a first position and aligned with the housing port in a second position to effect an audible whistle through the housing port.

* * * * *